(12) United States Patent
Mills

(10) Patent No.: US 11,972,348 B2
(45) Date of Patent: Apr. 30, 2024

(54) TEXTURE UNIT CIRCUIT IN NEURAL NETWORK PROCESSOR

(71) Applicant: Apple Inc., Cupertino, CA (US)

(72) Inventor: Christopher L. Mills, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 539 days.

(21) Appl. No.: 17/086,023

(22) Filed: Oct. 30, 2020

(65) Prior Publication Data

US 2022/0138553 A1 May 5, 2022

(51) Int. Cl.
*G06N 3/08* (2023.01)

(52) U.S. Cl.
CPC ...................................... *G06N 3/08* (2013.01)

(58) Field of Classification Search
CPC .......... G06N 3/08; G06N 3/044; G06N 3/048;
G06N 3/084; G06N 3/063; G06N 3/045;
G06N 3/04; G06N 3/082; G06N 20/00;
G06N 3/047; G06V 10/82; G06V 10/454;
G06V 10/764; G06V 10/40; G06V 10/94;
G06V 40/172; G06T 2207/20084; G06T
2207/20081; G06T 1/60; G06T 1/20;
G06T 5/20; G06T 7/0012; G06F 18/21;
G06F 18/03; G06F 18/214; G06F 17/15;
G06F 17/153; G06F 17/16; G06F
18/2163; G06F 2207/4824
See application file for complete search history.

(56) References Cited

U.S. PATENT DOCUMENTS

| | | | | |
|---|---|---|---|---|
| 10,853,726 | B2 * | 12/2020 | Zoph | G06N 3/045 |
| 11,256,940 | B1 * | 2/2022 | Wang | G06V 10/82 |
| 11,379,716 | B2 * | 7/2022 | Lin | G06N 3/082 |
| 11,537,838 | B2 * | 12/2022 | Norden | G06N 3/08 |
| 11,551,053 | B2 * | 1/2023 | Klaiman | G06N 3/04 |
| 11,555,706 | B1 * | 1/2023 | Levihn | G06N 3/09 |
| 11,640,533 | B2 * | 5/2023 | Whatmough | G06N 3/045 706/25 |
| 2006/0229856 | A1 | 10/2006 | Burrus et al. | |
| 2019/0042923 | A1 | 2/2019 | Janedula et al. | |
| 2019/0205736 | A1 | 7/2019 | Bleiweiss et al. | |
| 2019/0392287 | A1 | 12/2019 | Ovsiannikov et al. | |
| 2020/0082244 | A1 * | 3/2020 | Cho | G06V 10/82 |
| 2020/0134797 | A1 * | 4/2020 | Zhang | G06F 18/214 |
| 2020/0160226 | A1 | 5/2020 | Ross et al. | |

(Continued)

*Primary Examiner* — Michael S Osinski
(74) *Attorney, Agent, or Firm* — Sterne, Kessler, Goldstein & Fox P.L.L.C.

(57) ABSTRACT

Embodiments of the present disclosure relate to a texture unit circuit in a neural processor circuit. The neural processor circuit includes a tensor access operation circuit with the texture unit circuit, a data processor circuit, and at least one neural engine circuit. The texture unit circuit fetches a source tensor from a system memory by referencing an index tensor in the system memory representing indexing information into the source tensor. The data processor circuit stores an output version of the source tensor obtained from the tensor access operation circuit and sends the output version of the source tensor as multiple of units of input data to the at least one neural engine circuit. The at least one neural engine circuit performs at least convolution operations on the units of input data and at least one kernel to generate output data.

20 Claims, 7 Drawing Sheets

(56) References Cited

U.S. PATENT DOCUMENTS

| | | | |
|---|---|---|---|
| 2020/0184320 A1 | 6/2020 | Croxford et al. | |
| 2020/0234099 A1 | 7/2020 | Wang et al. | |
| 2020/0294182 A1 | 9/2020 | George et al. | |
| 2020/0302265 A1* | 9/2020 | Wang | G06N 3/04 |
| 2021/0012141 A1* | 1/2021 | Rao | G06V 10/94 |
| 2021/0042946 A1* | 2/2021 | Groh | G06N 3/045 |
| 2021/0174133 A1* | 6/2021 | Nitsch | G06F 18/217 |
| 2021/0192701 A1* | 6/2021 | Jie | G06T 11/00 |
| 2021/0224125 A1* | 7/2021 | Liu | G06F 9/5027 |
| 2021/0240895 A1* | 8/2021 | Pop | G06F 7/544 |
| 2021/0256365 A1* | 8/2021 | Wang | G06F 16/583 |
| 2021/0287083 A1* | 9/2021 | Bharadwaj | G06N 3/08 |
| 2021/0303359 A1 | 9/2021 | Park et al. | |
| 2021/0327583 A1* | 10/2021 | Harte | G16H 50/20 |
| 2021/0406649 A1* | 12/2021 | Zhang | G06F 9/30181 |
| 2022/0012587 A1* | 1/2022 | Kong | G06N 3/045 |
| 2022/0076062 A1* | 3/2022 | Lee | G06V 10/82 |
| 2022/0076411 A1* | 3/2022 | Georgescu | G06V 20/695 |
| 2022/0083857 A1* | 3/2022 | Li | G06N 3/045 |
| 2022/0157081 A1* | 5/2022 | Pan | G06Q 10/105 |
| 2022/0164639 A1* | 5/2022 | Gopalakrishnan | G06N 3/045 |
| 2022/0180167 A1* | 6/2022 | Karunaratne | G06N 3/065 |
| 2022/0197972 A1* | 6/2022 | Hayashi | G06N 3/063 |
| 2022/0215655 A1* | 7/2022 | Cao | G06N 3/063 |
| 2023/0031931 A1* | 2/2023 | Fukui | G06T 7/00 |

* cited by examiner

TEXTURE UNIT CIRCUIT IN NEURAL NETWORK PROCESSOR

BACKGROUND

1. Field of the Disclosure

The present disclosure relates to a circuit for performing operations related to neural networks, and more specifically to a texture unit circuit in a neural network processor.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of the CPU as well as increase the overall power consumption.

SUMMARY

Embodiments relate to a texture unit circuit in a neural processor circuit. The neural processor circuit includes a tensor access operation circuit with the texture unit circuit coupled to a system memory external to the neural processor circuit. The texture unit circuit of the tensor access operation circuit reads a source tensor from the system memory by referencing an index tensor in the system memory representing indexing information into the source tensor. The neural processor circuit further includes a data processor circuit coupled to the tensor access operation circuit and the texture unit circuit. The data processor circuit stores an output version of the source tensor obtained from the tensor access operation circuit and sends the output version of the source tensor as multiple of units of input data. The neural processor circuit further includes at least one neural engine circuit coupled to the data processor circuit. The at least one neural engine circuit receives the units of input data from the data processor circuit and performs at least convolution operations on the units of input data and at least one kernel to generate output data.

Figure 1:
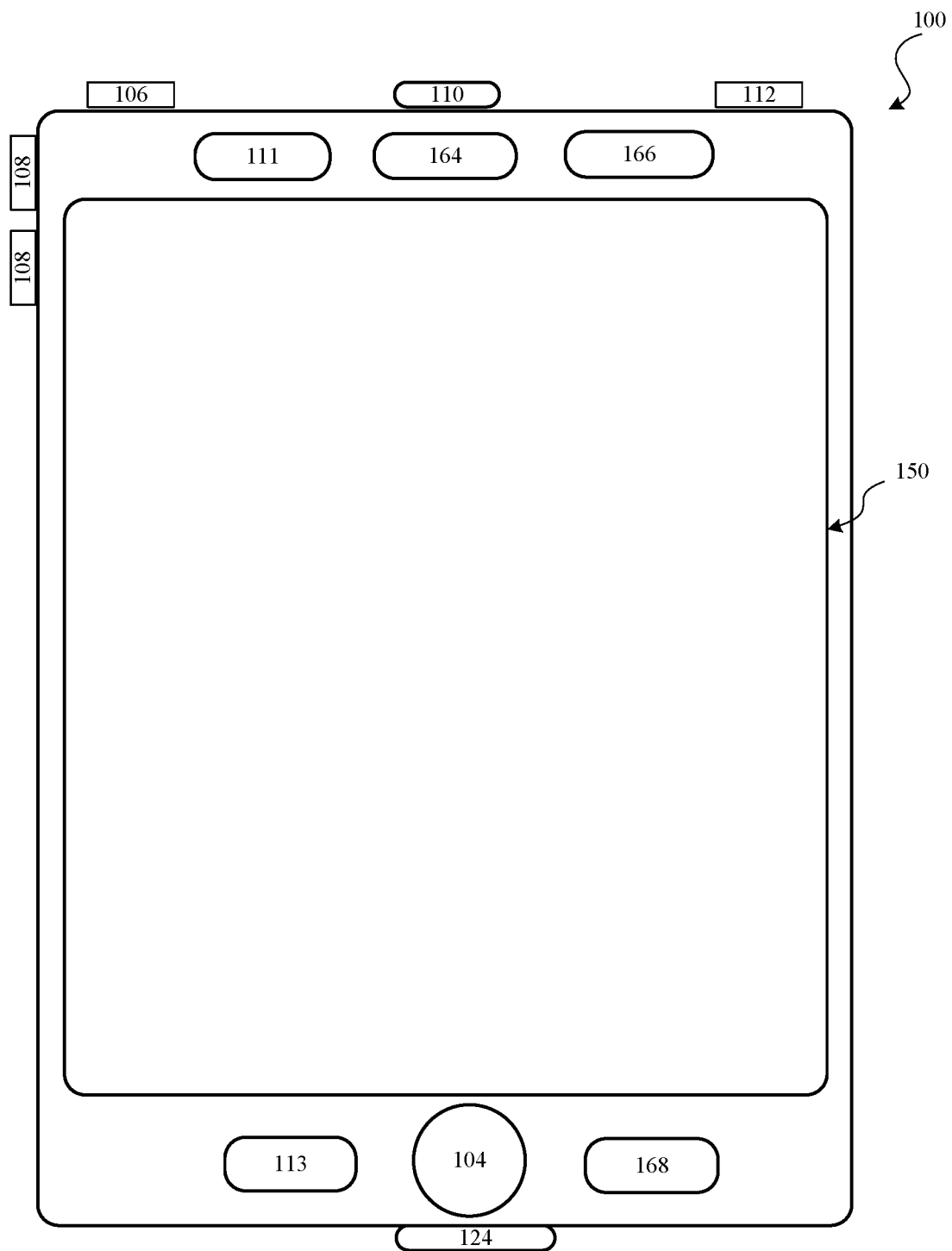
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a texture unit circuit in a neural processor circuit. The texture unit circuit applies a level of indirection on an input surface read from a system memory external to the neural processor circuit, thus providing desired flexibility in higher-level (e.g., five-dimensional) texture transforms of source components (e.g., source data) when fetching the source components from the system memory for usage by a neural engine circuit of the neural processor circuit (e.g., for convolution operations). The texture unit circuit indirectly accesses a source tensor in the system memory by referencing an index tensor allocated in the system memory that represents indexing information into the source tensor. The texture unit circuit is part of a tensor access operation circuit interfaced between the system memory and a data processor circuit of the neural processor circuit. The data processor circuit stores an output version of the source tensor obtained from the tensor access operation circuit and sends the output version of the source tensor as multiple of units of input data to the neural engine circuit. The neural engine circuit performs at least convolution operations on the units of input data.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used.

In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
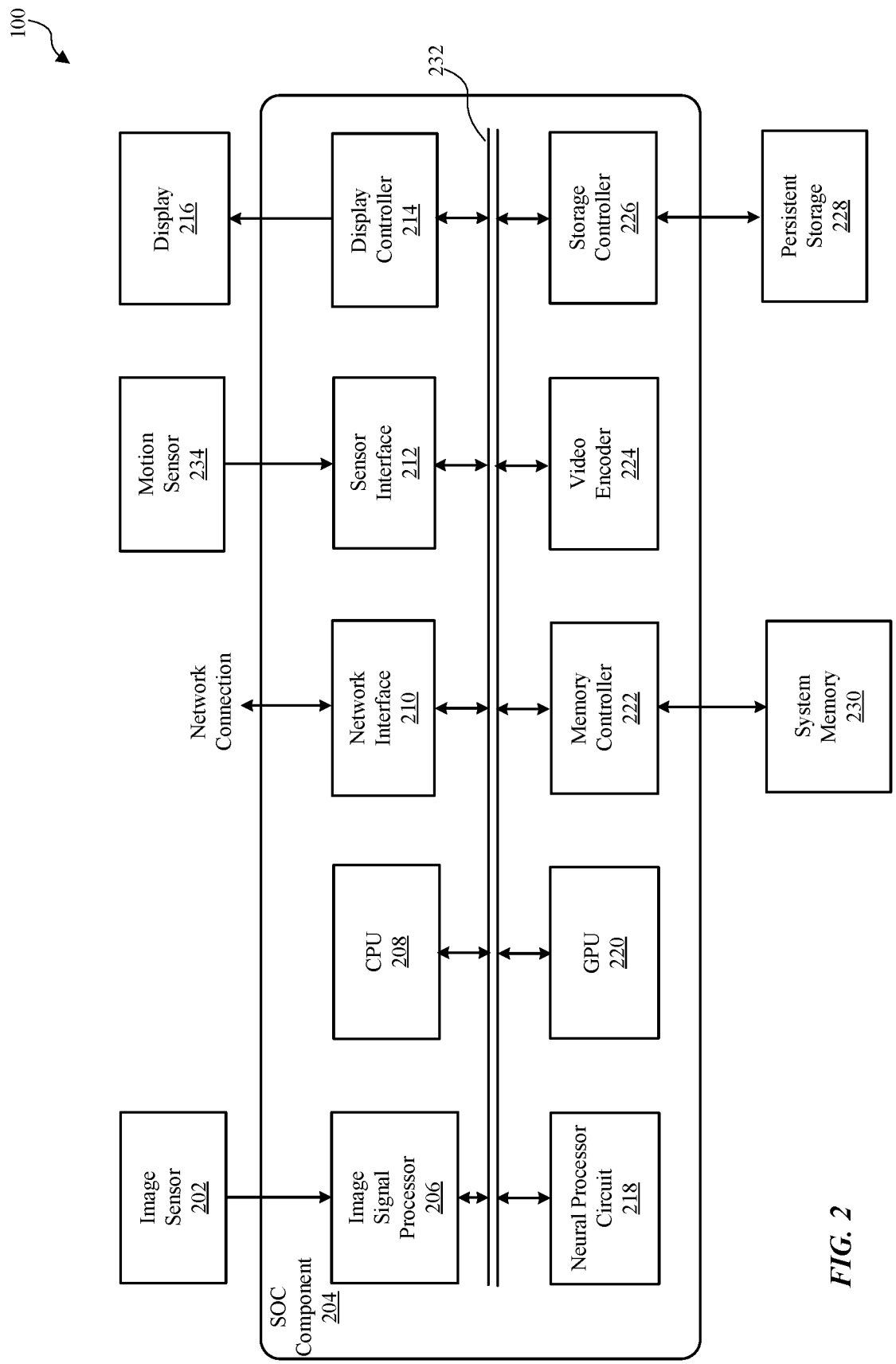
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor, a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tan h), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
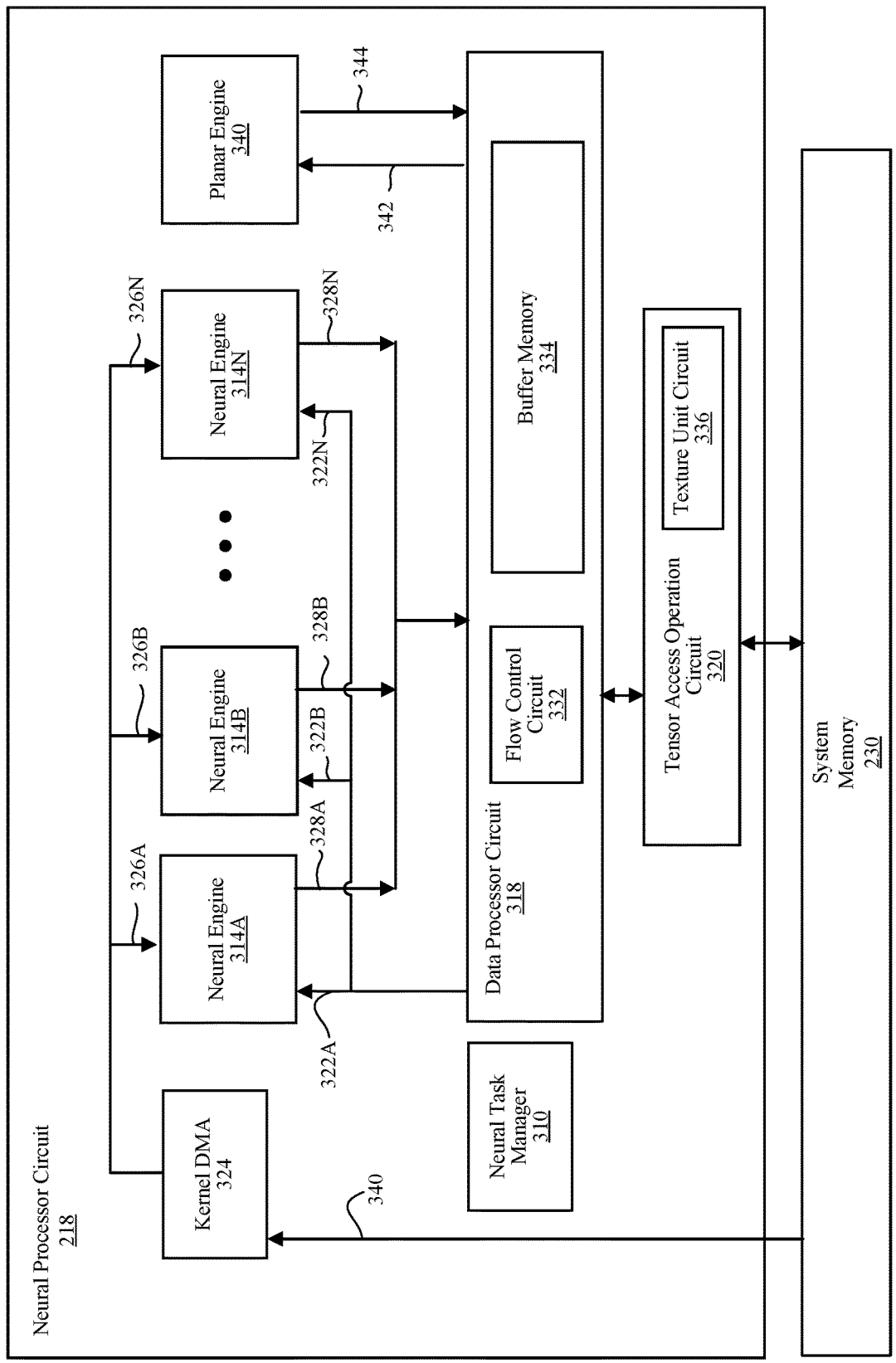
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, tensor access operation circuit 320, and planar engine 340. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduce a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of neural processor circuit 218 for performing the chosen task. Data may be associated with a task command that indicates the types of operations to be performed on the data. Data of neural processor circuit 218 includes input data that is transmitted from another source such as system memory 230, and data generated by neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by neural processor circuit 218. Although neural task manager 310 is illustrated in FIG. 3 as part of neural processor circuit 218, neural task manager 310 may be a component outside neural processor circuit 218.

Kernel DMA 324 is a read circuit that fetches kernel data from a source (e.g., system memory 230) and sends kernel data 326A through 326N to each of neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a flow control circuit 332 and a buffer memory 334. Buffer memory 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The data stored in data processor circuit 318 may include different subsets that are sent to various downstream components, such as neural engines 314 and planar engine 340.

In one embodiment, buffer memory 334 is embodied as a non-transitory memory that can be accessed by neural engines 314 and planar engine 340. Buffer memory 334 may store input data 322A through 322N for feeding to corresponding neural engines 314A through 314N or planar engine 340, as well as output data 328A through 328N from each of neural engines 314A through 314N or planar engine 340 for feeding back into one or more neural engines 314 or planar engine 340, or sending to a target circuit (e.g., system memory 230). Buffer memory 334 may also store input data 342 and output data 344 of planar engine 340 and allow the exchange of data between neural engine 314 and planar engine 340. For example, one or more output data 328A through 328N of neural engines 314 are used as the input 342 to planar engine 340. Likewise, the output 344 of planar engine 340 may be used as the input data 322A through 322N of neural engines 314. The inputs of neural engines 314 or planar engine 340 may be any data stored in buffer memory 334. For example, in various operating cycles, the source datasets from which one of the engines fetches as inputs may be different. The input of an engine may be an output of the same engine in previous cycles, outputs of different engines, or any other suitable source datasets stored in buffer memory 334. Also, a dataset in buffer memory 334 may be divided and sent to different engines for different operations in the next operating cycle. Two datasets in buffer memory 334 may also be joined for the next operation.

Flow control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Flow control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes.

The data of neural processor circuit 218 stored in buffer memory 334 may be part of, among others, image data, histogram of oriented gradients (HOG) data, audio data, metadata, output data 328 of a previous cycle of a neural engine 314, and other processed data received from other components of the SOC component 204.

Tensor access operation circuit 320 includes a read circuit that receives a segment (e.g., a tensor) of the input data from a source (e.g., system memory 230) for storing in buffer memory 334, and a write circuit that forwards data from buffer memory 334 to a target component (e.g., system memory 230). In one embodiment, the direct memory access nature of tensor access operation circuit 320 may allow tensor access operation circuit 320 to fetch and write data directly from a source (e.g., system memory 230) without the involvement of CPU 208. Buffer memory 334 may be a direct memory access buffer that stores data of a machine learning model of device 100 without involvement of CPU 208. Tensor access operation circuit 320 includes a texture unit circuit 336 for fetching the segment (e.g., tensor) of the input data from system memory 230 and for processing the tensor before sending the tensor to buffer memory 334. The structure and operations of tensor access operation circuit 320 and texture unit circuit 336 will be discussed in further detail below with reference to FIG. 6 and FIG. 7.

Example Neural Engine Architecture

Figure 4:
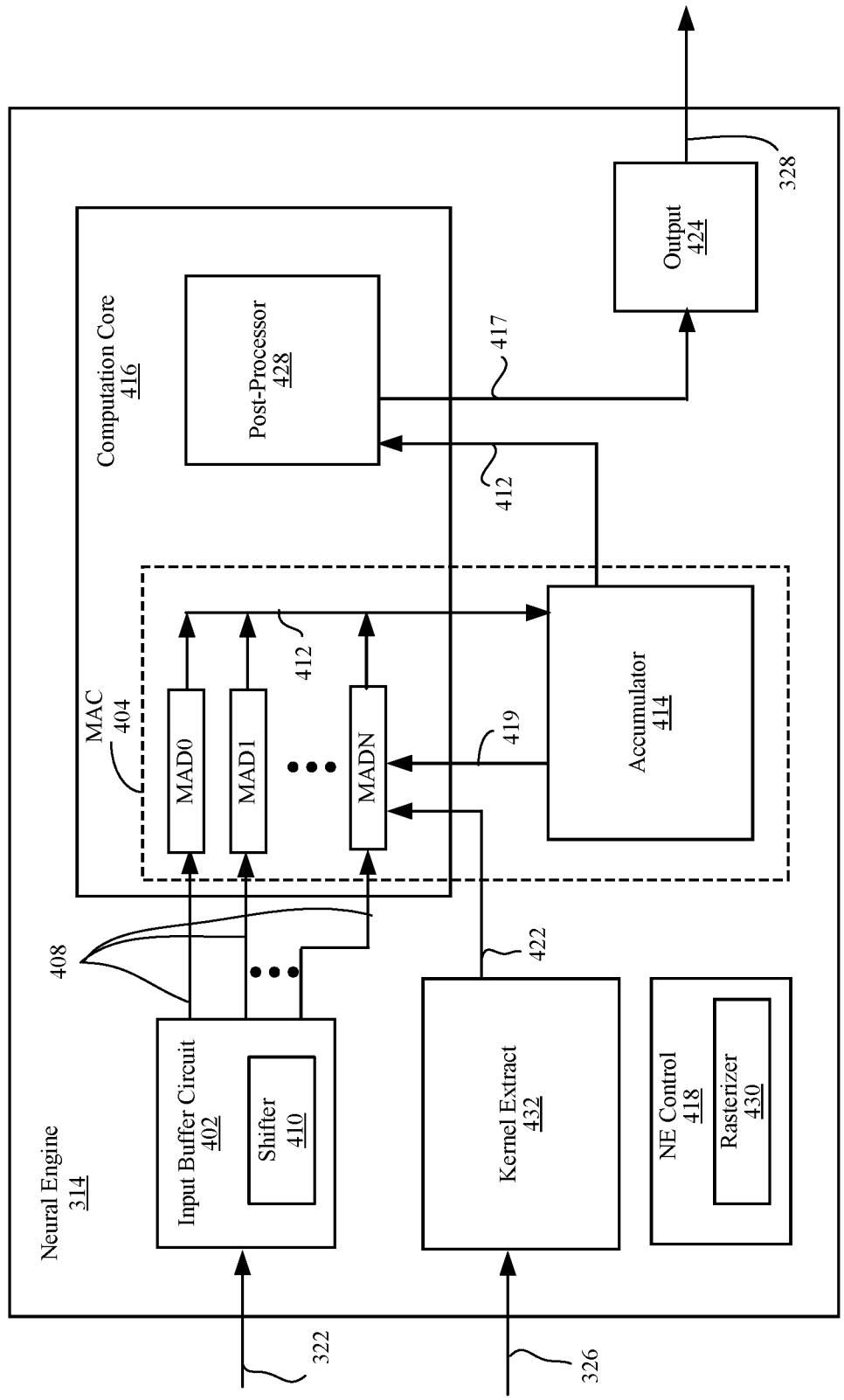
FIG. 4 is a block diagram of a neural engine in the neural processor circuit, according to one embodiment.

FIG. 4 is a block diagram of neural engine 314, according to one embodiment. Neural engine 314 performs various operations to facilitate machine learning such as convolution, tensor product, and other operations that may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator circuit 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator circuit 414 is a memory circuit that receives and stores processed values 412 from MAD circuits. The processed values stored in accumulator circuit 414 may be sent back as feedback information 419 for further multiply and add operations at MAD circuits or sent to post-processor 428 for post-processing. Accumulator circuit 414 in combination with MAD circuits form a multiply-accumulator (MAC) 404.

Post-processor 428 is a circuit that performs further processing of values 412 received from accumulator circuit 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator circuit 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator circuit 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator circuit 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through the MACs 404 and accumulator circuit 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to buffer memory 334. Other components of neural processor circuit 218 (e.g., kernel DMA 324, tensor access operation circuit 320, buffer memory 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Planar Engine

Figure 5:
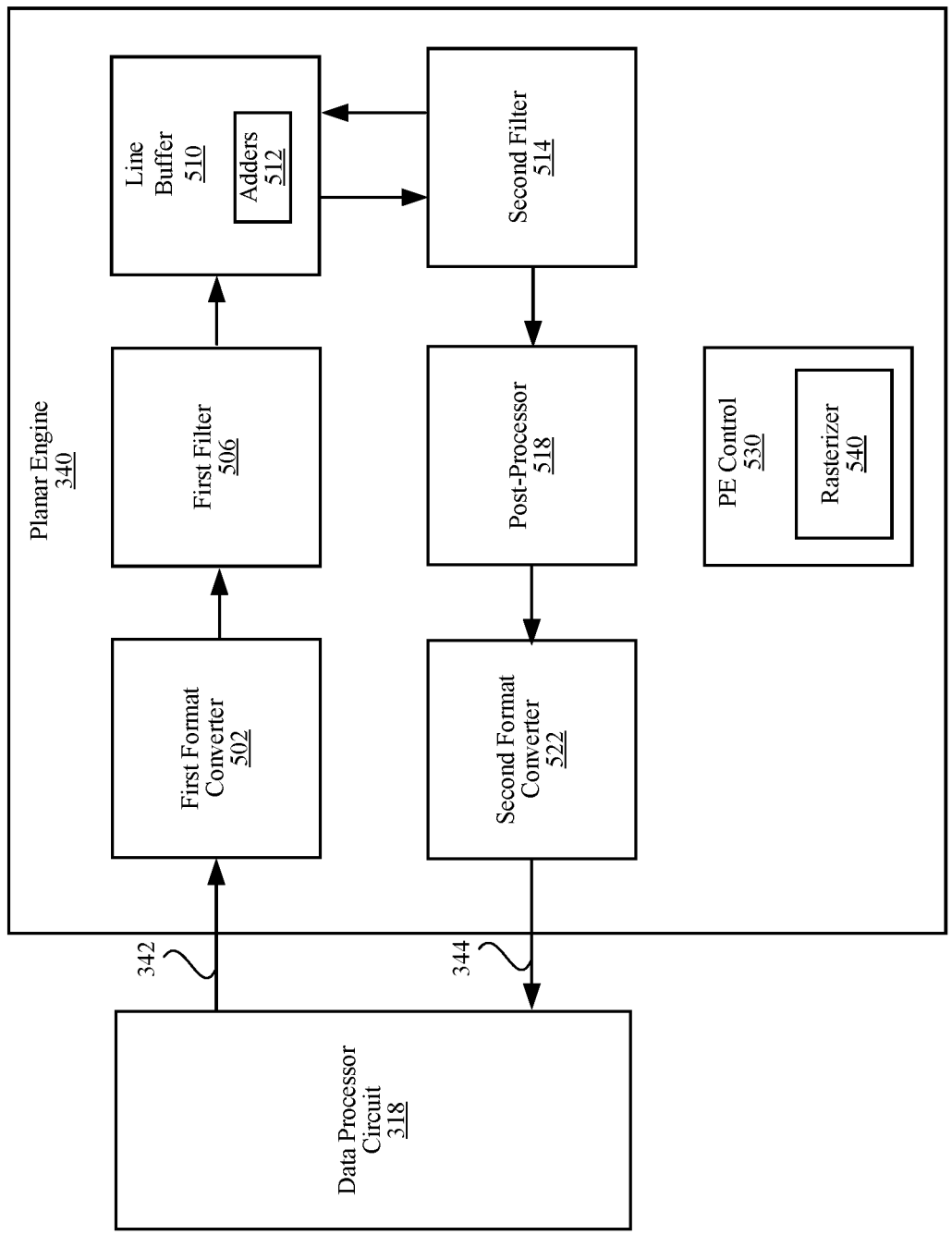
FIG. 5 is a block diagram of a planar engine in the neural processor circuit, according to one embodiment.

FIG. 5 is a block diagram of planar engine 340, according to one embodiment. Planar engine 340 is a circuit that is separated from the plurality of neural engines 314 and can be programmed to perform in different modes of operations. For example, planar engine 340 may operate in a pooling mode that reduces the spatial size of data, in a reduction mode that reduces the rank of a tensor, in a gain-and-bias mode that provides a single-pass addition of bias and scaling by a scale factor, and in an elementwise mode that includes elementwise operations. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processor 518, a second format converter 522, and a planar engine (PE) control 530 (includes rasterizer 540). Planar engine 340 may include fewer components or further components not illustrated in FIG. 5. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. For example, in an elementwise mode that involves the addition of two different tensors to derive a resultant tensor, the input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 in one format (e.g., a format used for storing in buffer memory 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In a reduction mode, for example, first filter 506 performs elementwise operations while second filter 514 functions as a reduction tree to aggregate values of data.

Post-processor 518 is a circuit that performs further processing of values fetched from other upstream components. Post-processor 518 may include specialized circuits that are efficient at performing certain types of mathematical computations that might be inefficient to perform using a general computation circuit. Operations performed by post-processor 518 may include, among others, performing square root operations and inverse of values in a reduction mode. Post-processor 518 may be bypassed in other operation modes.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed at by first filter 506 may be stored in line buffer 510 and then be read by second filter 514 for further filtering. In the reduction mode, however, data is processed by first filter 506, then processed at second filter 514 and then accumulated in line buffer 510 that is programmed as an accumulator. In the elementwise mode, line buffer 510 may be bypassed.

PE control 530 also includes a rasterizer 540 that tracks the current task or process loop being processed at planar engine 340. Rasterizer 540 is a circuit that tracks units or segments of input data and/or loops for processing the input data in planar engine 340. Rasterizer 540 may control the fetch of segments to planar engine 340 in each operation cycle and may monitor the size and rank of each segment being processed by planar engine 340. For example, smaller segments of a dataset may be fetched as input data 342 in a raster order for processing at planar engine 340 until all segments of the source dataset are processed. In fetching the segments, rasterizer 540 monitors the coordinate of the segment in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such case, planar engine 340 fetches different segments of the dataset as input data 342 in multiple operating cycles. The fetched segment may partly overlap with a previously fetched segment and/or a next segment to be fetched. In one embodiment, the portion of overlapping data is fetched only once and reused to reduce the time and power consumption cost of planar engine 340 in fetching data.

Example Texture Unit Circuit in Neural Processor Circuit

Figure 6:
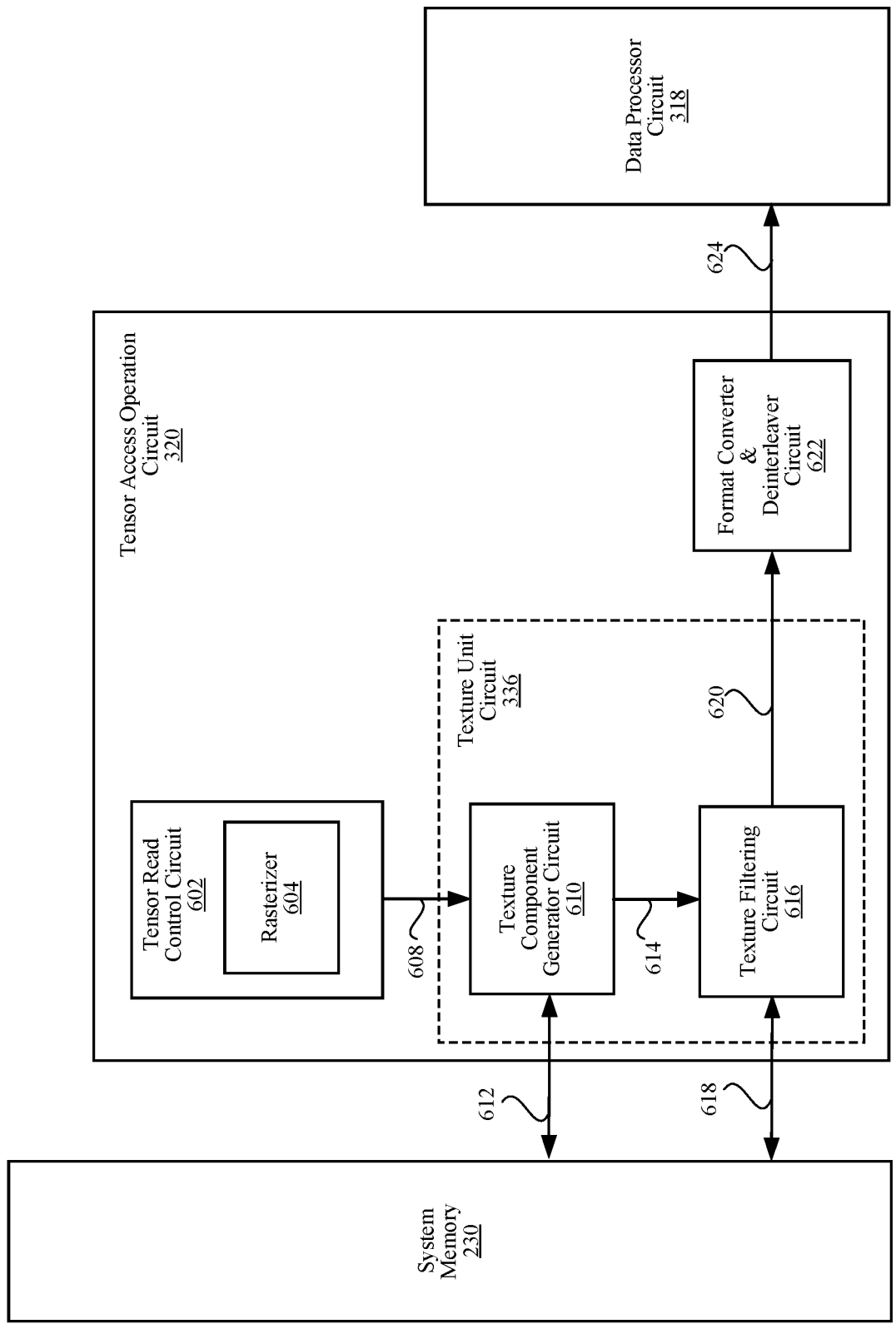
FIG. 6 is a block diagram of a tensor access operation circuit with a texture unit circuit in the neural processor circuit for fetching a source tensor from a system memory external to the neural processor circuit, according to one embodiment.

FIG. 6 is a block diagram of tensor access operation circuit 320 with texture unit circuit 336 for fetching a source tensor 618 from system memory 230 using indirection, according to one embodiment. Tensor access operation circuit 320 fetches source tensor 618 from system memory 230 by referencing index tensor 612 allocated in system memory 230 that represents indexing information into source tensor 618. Tensor access operation circuit 320 includes a tensor read control circuit 602, texture unit circuit 336, and a format converter and deinterleaver circuit 622. Tensor access operation circuit 320 may include fewer or additional components not illustrated in FIG. 6.

Tensor read control circuit 602 includes a rasterizer 604 that generates source index 608 for indirect referencing of source tensor 618. Source index 608 is an index over an input back-projection of a source surface allocated in system memory 230. In one or more embodiment, source index 608 is a five-dimensional tuple with index components representing, e.g., width, height, channel, depth, and group of the source surface. Each index component of source index 608 represents a particular location of a source component in an input activation layer of convolution (referred herein as output version of source tensor 624) stored in data processor circuit 318 after being fetched from system memory 230 and processed by tensor access operation circuit 320. In some embodiments, tensor read control circuit 602 may perform some additional operations, e.g., three-dimensional (3D) sequencing of one or more surfaces in system memory 230.

Source index 608 may be used for computing a specific permutation of five-dimensional indexes in a source surface (e.g., convolution source) allocated in system memory 230. Additionally, source index 608 may be used for grouping source components of the convolution source into chunks to be operated in parallel in a manner that attempts to maximize utilization of at least one neural engine 314 when performing, e.g., convolution. For example, if a convolution operation was producing output data 328 of spatial dimensions 48×48, rasterizer 604 can generate source index 608 that chunks the convolution source in system memory 230 into, e.g., nine 16×16 work units to increase utilization of 256 MADs per neural engine 314. Source index 608 generated by rasterizer 604 may be thus related to a three-dimensional cube (e.g., width, height, channel) in a five-dimensional convolution output (output version of source tensor 624) which neural engine 314 will work on. To produce the five-dimensional convolution output, the back-projection to the source surface in system memory 230 is be performed, e.g., via source index 608. The produced five-dimensional convolution output (output version of source tensor 624) would be delivered by data processor circuit 318 to at least one neural engine 314 for performing, e.g., convolution.

Tensor read control circuit 602 (e.g., via rasterizer 604 or a module of separate from rasterizer 604) may also perform a cubularization process when generating source index 608. The cubularization process may include: accession of granularity differences between source tensor 618 and output version of source tensor 624; accession of granularity optimization of internal interfaces (e.g., between tensor access operation circuit 320 and data processor circuit 318, or between data processor circuit 318 and at least one neural engine 314); and avoidance of re-fetching data that was previously fetched because of e.g., back-projection overlap. Source index 608 generated by tensor read control circuit 602 is passed onto texture unit circuit 336.

Texture unit circuit 336 applies a level of indirection on a source read from system memory 230 using index tensor 612. Texture unit circuit 336 uses source index 608 to fetch index tensor 612 allocated in system memory 230 which represents indexing information into source tensor 618. Texture unit circuit 336 fetches one or more source components of source tensor 618 from system memory 230 by referencing index tensor 612. Texture unit circuit 336 also processes the fetched one or more source components to generate a processed version of source tensor 620 passed onto, e.g., format converter and deinterleaver circuit 622.

Texture unit circuit 336 may operate in one of two mutually exclusive modes, e.g., a in gather mode or in a crop mode. In the gather mode, texture unit circuit 336 computes indirect source index 614 (e.g., five-dimensional tuple) as an indirect index into source tensor 618 using both source index 608 and index tensor 612 (e.g., based on some configurable combination of source index 608 and index tensor 612). Then, texture unit circuit 336 gathers the one or more source components of source tensor 618 from system memory 230. In the crop mode, instead of reading source tensor 618 from system memory 230 for each value of source index 608, texture unit circuit 336 treats index tensor 612 as a list of sampling parameters, one for each group. Texture unit circuit 336 computes indirect source index 614 using source index 608 and the sampling parameters in index tensor 612. In some embodiments, texture unit circuit 336 first converts the per-group parameters in index tensor 612 into plane equations for the group, and then applies the plane equations to source index 608 to produce indirect source index 614.

In some embodiments, texture unit circuit 336 can apply two spatial plane equations (e.g., for x and y spatial components) effectively providing an affine transformation to two spatial components of source index 608 (e.g., $(x', y')=M*(x, y)$, where M is a 3×2 matrix) with the remaining components of source index 608 having fixed-functionality (e.g., pass-through or simple indirect). In some other embodiments, texture unit circuit 336 can apply more than two plane equations thus allowing other transformations applied to source index 608 for referencing index tensor 612 in system memory 230. For example, texture unit circuit 336 can further apply the third plane equation for z dimension (e.g., depth component) which allows a three-dimensional affine transformation of all spatial components of source index 608 (e.g., (x', y', z')=M*(x, y, z), where M is a 4×3 three-dimensional affine transform matrix). Similarly, texture unit circuit 336 can apply the third plane equation for w component and per-component perspective divide allows performing a perspective transform, e.g., (u, v, w)=M*(x, y); (x, y)=(u/w, v/w), where M is a 3×3 two-dimensional perspective transform matrix. Additionally, texture unit circuit 336 can apply the third plane equation as the combination of the aforementioned plane equations (e.g., apply 4×4 three-dimensional perspective transform) by adding two more steppers. Furthermore, texture unit circuit 336 can apply other plane equations for transformation of batch components of source index 608 (e.g., group and channel) for referencing index tensor 612 in system memory 230.

Texture unit circuit 336 itself can be divided into two circuits: a texture component generator circuit 610 that controls generation of indirect source index 614 from source index 608 and contents of index tensor 612; and a texture filtering circuit 616 that uses indirect source index 614 to address source tensor 618 and applies processing of source tensor 618 (e.g., bilinear resampling, boundary padding, etc.) to generate processed version of source tensor 620. Both texture component generator circuit 610 and texture filtering circuit 616 may be directly coupled to system memory 230. Texture unit circuit 336 may include additional components not illustrated in FIG. 6.

Texture component generator circuit 610 receives source index 608 from tensor read control circuit 602 (e.g., from rasterizer 604) and fetches index tensor 612 allocated in system memory 230 using source index 608. Texture component generator circuit 610 may apply a first configurable function to convert source index 608 into an appropriate format for referencing index tensor 612 allocated in system memory 230. The first configurable function may decide which of the five components of source index 608 will be used to address index tensor 612, and in what order, which may be performed through two steps. In the first step, the first configurable function of texture component generator circuit 610 may reduce a rank of source index 608 by dropping zero or more components of source index 608 (e.g., by setting the zero or more components to an extent of one). In the second step, after possibly reducing rank of source index 608, the first configurable function of texture component generator circuit 610 may effectively transpose index tensor 612 by reordering the components in source index 608.

Texture component generator circuit 610 computes, using index tensor 612 and source index 608, indirect source index 614 for indirect addressing of source tensor 618 in system memory 230. Texture component generator circuit 610 may apply a second configurable function that combines source index 608 and index tensor 612 (e.g., five-dimensional indexes) to generate indirect source index 614. Both source index 608 and indirect source index 614 may comprise five-dimensional tensor indexes, and the five dimensions of source index 608 and indirect source index 614 may be ordered as, e.g., group, depth, height, width, and channel. Texture component generator circuit 610 passes indirect source index 614 onto texture filtering circuit 616.

Texture filtering circuit 616 fetches source tensor 618 allocated in system memory 230 by referencing one or more source components of source tensor 618 using indirect source index 614. While fetching source tensor 618 from system memory 230, texture filtering circuit 616 also processes (filters) the one or more source components of source tensor 618, e.g., by applying multi-dimensional filtering to generate processed version of source tensor 620. Texture filtering circuit 616 processes the one or more source components of source tensor 618 by performing one or more operations on source tensor 618, e.g., bilinear interpolation, interleaving, boundary padding, reshaping, three-dimensional filtering, nearest-neighbor interpolation, etc. In some embodiments, texture filtering circuit 616 performs either two-dimensional bilinear interpolation or two-dimensional nearest-neighbor interpolation applied to source components of source tensor 618 (e.g., to spatial components of source tensor 618) along with one or more boundary padding schemes (e.g., clamp-to-edge, clamp-to-border, reflect, etc.). For the non-spatial dimensions of source tensor 618, texture filtering circuit 616 may perform nearest-neighbor sampling and clamp-to-edge/clamp-to-border boundary padding. In some other embodiments, texture filtering circuit 616 performs a higher dimension bilinear interpolation on source components of source tensor 618 (e.g., three-dimensional tri-linear spatial filtering, or five-dimensional linear filtering) along with boundary padding in either all three spatial dimensions or in all five dimensions including non-spatial dimensions.

Texture filtering circuit 616 may utilize fractional pixel offsets to perform the bilinear interpolation in, e.g., two spatial dimensions. During fetching, texture filtering circuit 616 may perform between one and four references to the one or more source components of source tensor 618. The efficiency of texture filtering circuit 616 may depend on which source component(s) of source tensor 618 are pass-through (e.g., unchanged) source components. Texture filtering circuit 616 may perform e.g., up to four bilinear interpolate operations per clock cycle. In some embodiments, texture filtering circuit 616 includes a cache (not shown in FIG. 6), so that spatially and/or temporally local accesses do not make fetches to system memory 230.

Texture filtering circuit 616 may perform multiple (e.g., up to four) bilinear filters per clock cycle on different source components of source tensor 618. To perform the multiple bilinear filters per clock cycle, the source components of source tensor 618 are co-allocated (e.g., interleaved together) in system memory 230 so that the source components of source tensor 618 can be fetched together at texture filtering circuit 616 by a single memory access. This may require that the source components of source tensor 618 have a channel component as pass-through, thus allowing as many components as there are in an interleave factor of source tensor 618 to be read at once. In some embodiments, a coalescing circuit (not shown in FIG. 6) is coupled between texture filtering circuit 616 and format converter and deinterleaver circuit 622. Format converter and deinterleaver circuit 622 expects processed version of source tensor 620 to be pushed as, e.g., 64B chunks of data, one per clock cycle. However, e.g., in some low-throughput filter modes, texture filtering circuit 616 may produce as little as a single byte per clock cycle of data. In such cases, the coalescing circuit may accumulate the data produced by texture filtering circuit 616 until a full unit of data (e.g., 64B word) of processed version of source tensor 620 can be pushed onto format converter and deinterleaver circuit 622.

A particular level of granularity (e.g., 64-byte granularity) enforced by data processor circuit 318 can cause an entire group of source components in system memory 230 to be out-of-bounds. In this case, rasterizer 604 (or some other module of tensor read control circuit 602) may label one or more source components of source tensor 618 as being out-of-bounds. Texture filtering circuit 616 may then skip filtering (e.g., at least one of bilinear interpolation, interleaving, three-dimensional filtering, nearest-neighbor interpolation) of the one or more source components. Instead, texture filtering circuit 616 may apply boundary padding (e.g., zero padding) to the one or more source components of source tensor 618 to generate processed version of source tensor 620. Texture filtering circuit 616 may perform boundary padding by applying clamp-to-edge padding (e.g., replication of pixel values), clamp-to-border padding (e.g., padding based on a configurable background value), reflect-mode padding (e.g., reflection based padding where pixel values ABC become ABCBA), symmetric-mode padding (e.g., reflection based padding that duplicates a reflected pixel, pixel values ABC to be reflected into ABCCBA), some other padding scheme, or combination thereof.

Out-of-bounds components of processed version of source tensor 620 are those components that are sent to data processor circuit 318 but do not correspond to valid pixels in a convolution source. Since the out-of-bounds components will not be used by neural engine(s) 314 for the convolution, corresponding pixel values are only emitted from texture filtering circuit 616 as padding values (e.g., zero values) for later storage into data processor circuit 318 and no texture operation is performed for these padding pixel values.

Additionally, processed version of source tensor 620 may also include clipped pixels. The clipped pixels correspond to valid pixels in the convolution source that did not map to a valid portion of source tensor 618. The clipped pixels can be differentiated as either backgrounded pixels or clamped pixels. The backgrounded pixels are pixels corresponding to a "background" color. The invalid addressing resulting into backgrounded pixels in processed version of source tensor 620 can happen when index tensor 612 points outside of source tensor 618 allocated in system memory 230 and backgrounding is enabled, e.g., by a task descriptor (rasterizer 604). This can also happen when computation of index tensor 612 (e.g., by texture component generator circuit 610) produces a nonsensical (NaN) value for at least one component of index tensor 612. Texture filtering circuit 616 does not perform any filtering operations for the backgrounded pixels. Instead, texture filtering circuit 616 may provide at last one programmable background value for replacing the backgrounded pixels in processed version of source tensor 620. The clamped pixels in processed version of source tensor 620 are pixels that are clamped to an edge of source tensor 618. The invalid addressing resulting into the clamped pixels in processed version of source tensor 620 can happen when index tensor 612 points outside of source tensor 618 allocated in system memory 230 and the backgrounding is not enabled. Texture filtering circuit 616 fetches components from system memory 230 that correspond to the clamped pixels, e.g., in order to find the closest valid source component for processed version of source tensor 620.

Processed version of source tensor 620 generated by texture filtering circuit 616 is passed onto, e.g., format converter and deinterleaver circuit 622 that may be directly coupled to data processor circuit 318. Format converter and deinterleaver circuit 622 performs format conversion and deinterleaving of processed version of source tensor 620 produced by texture filtering circuit 616 to generate an output version of source tensor 624 for storage (e.g., in a planar arrangement) into data processor circuit 318 (e.g., into buffer memory 334). In some embodiments, format converter and deinterleaver circuit 622 is bypassed, and processed version of source tensor 620 produced by texture filtering circuit 616 represents output version of source tensor 624 stored into data processor circuit 318.

In some embodiments, data processor circuit 318 sends output version of source tensor 624 as multiple units of input data 322 to at least one neural engine 314 that performs at least convolution operations on the units of input data 322 and at least one kernel 326 to generate output data 328 for storage into, e.g., data processor circuit 318. Alternatively or additionally to convolution operations, at least one neural engine 314 may perform some other operations on output version of source tensor 624, e.g., element-wise operations, activation functions, sinus based functions, exponential functions, a floor function, a reduction operation, an argmax operation, a sorting operation, some other function or operation, or combination thereof. Planar engine 340 may perform a planar operation on at least a portion of output data 328 received from data processor circuit 318 as input data 342 to generate output data 344, which may be written back into data processor circuit 318 (e.g., into buffer memory 334). In some other embodiments, data processor circuit 318 sends output version of source tensor 624 as multiple units of input data 342 directly to planar engine 340. Alternatively, both neural engine 314 and planar engine 340 may pass output version of source tensor 624 (e.g., as multiple units of input data 322 or input data 342) without any modification, e.g., when only texturing operation is required without additional convolution operation. Additionally or alternatively, one or more data-transfer functions can be applied on output version of source tensor 624 while transferring output version of source tensor 624 to at least one neural engine 314 or planar engine 340, e.g., format conversion, scaling function, transpose function, reshaping, some other data-transfer function or combination thereof. In some other embodiments, output version of source tensor 624 produced by tensor access operation circuit 320 is provided to one or more other circuits different than at least one neural engine 314 and planar engine 340, e.g., a reshape circuit, a kernel packer circuit, etc.

Example Process at Neural Engine Architecture

Figure 7:
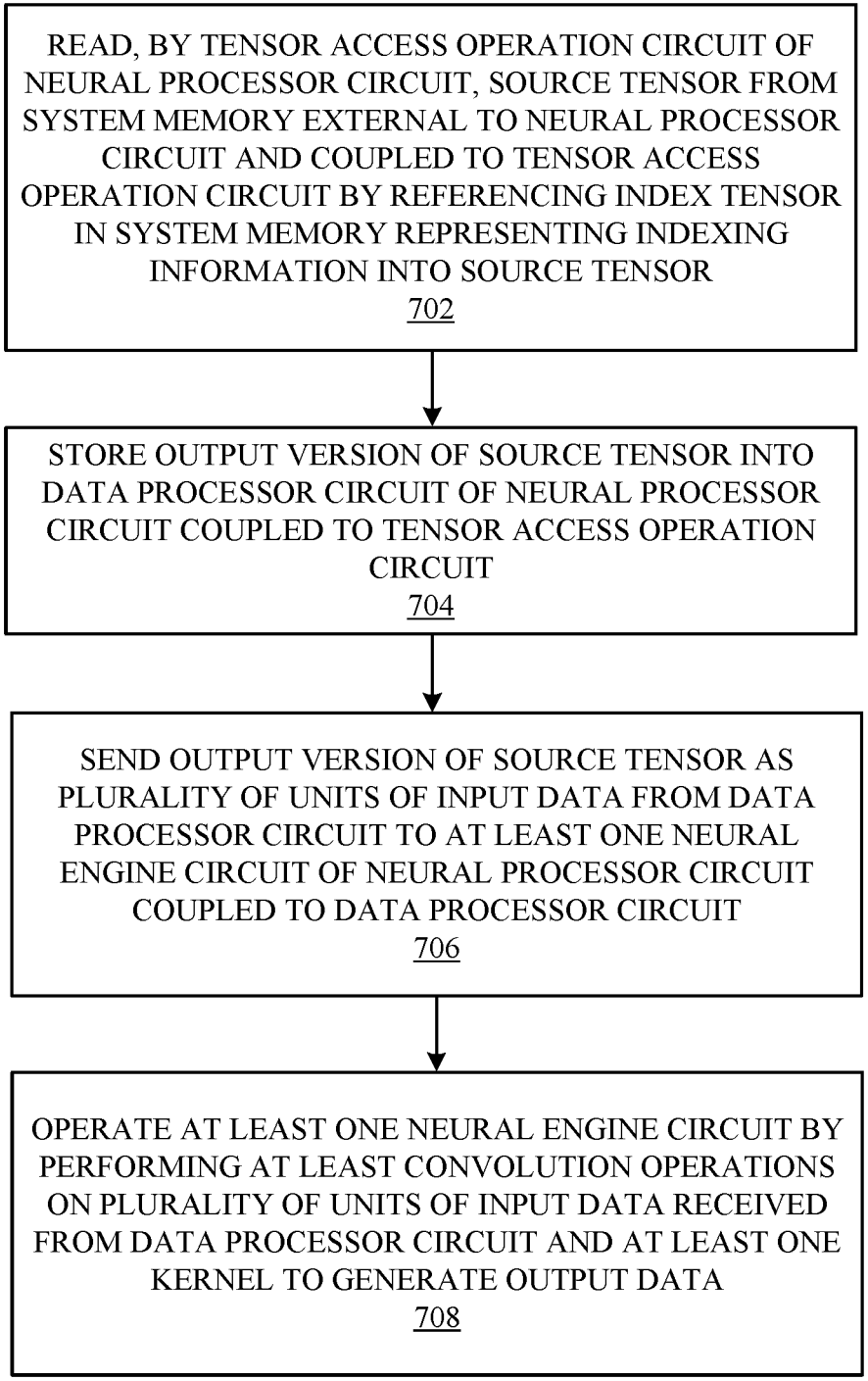
FIG. 7 is a flowchart illustrating a method of operating the neural processor circuit having the tensor access operation circuit with the texture unit circuit, according to one embodiment.

FIG. 7 is a flowchart illustrating a method of operating a neural processor circuit (e.g., neural processor circuit 218) with a tensor access operation circuit (e.g., tensor access operation circuit 320 including texture unit circuit 336), according to one embodiment. The neural processor circuit reads 702 (e.g., by the tensor access operation circuit), a source tensor from a system memory external to the neural processor circuit and coupled to the tensor access operation circuit by referencing an index tensor allocated in the system memory representing indexing information into the source tensor.

The neural processor circuit stores 704 an output version of the source tensor into a data processor circuit (e.g., data processor circuit 318) of the neural processor circuit coupled to the tensor access operation circuit. The neural processor circuit sends 706 the output version of the source tensor as multiple units of input data from the data processor circuit to at least one neural engine circuit (e.g., at least one neural engine 314) of the neural processor circuit coupled to the data processor circuit. The neural processor circuit operates 708 the at least one neural engine circuit by performing at least convolution operations on the units of input data received from the data processor circuit and at least one kernel to generate output data.

Embodiments of the process as described above with reference to FIG. 7 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit, comprising:
a tensor access operation circuit coupled to a system memory external to the neural processor circuit, the tensor access operation circuit configured to read a source tensor from the system memory by referencing an index tensor in the system memory representing indexing information into the source tensor;
a data processor circuit coupled to the tensor access operation circuit, the data processor circuit configured to:
store an output version of the source tensor obtained from the tensor access operation circuit, and
send the output version of the source tensor as a plurality of units of input data; and
at least one neural engine circuit coupled to the data processor circuit, the at least one neural engine circuit configured to:
receive the plurality of units of input data from the data processor circuit, and
perform at least convolution operations on the plurality of units of input data and at least one kernel to generate output data.

2. The neural processor circuit of claim 1, wherein the tensor access operation circuit comprises a texture unit circuit coupled to the system memory, the texture unit circuit configured to:
fetch one or more source components of the source tensor from the system memory by referencing the index tensor; and
process the one or more source components to generate the output version of the source tensor.

3. The neural processor circuit of claim 1, wherein the tensor access operation circuit comprises a texture unit circuit including a texture component generator circuit coupled to the system memory, the texture component generator circuit configured to:
receive a source index;
read the index tensor allocated in the system memory using the source index; and
compute, using the index tensor and the source index, an indirect source index for indirect addressing of the source tensor in the system memory.

4. The neural processor circuit of claim 3, wherein each of the source index and the indirect source index comprises a five-dimensional tensor index.

5. The neural processor circuit of claim 3, wherein the tensor access operation circuit comprises a tensor read control circuit coupled to the texture component generator circuit, the tensor read control circuit configured to generate the source index using a rasterizer of the tensor read control circuit.

6. The neural processor circuit of claim 3, wherein the texture unit circuit further includes a texture filtering circuit coupled to the system memory, the texture filtering circuit configured to:
fetch the source tensor from the system memory using the indirect source index; and
process the source tensor by applying multi-dimensional filtering to the source tensor to generate the output version of the source tensor.

7. The neural processor circuit of claim 6, wherein the texture filtering circuit is further configured to process the source tensor by performing bilinear resampling and boundary padding applied on the source tensor to generate the output version of the source tensor.

8. The neural processor circuit of claim 1, wherein the index tensor comprises a list of sampling parameters, and the tensor access operation circuit comprises a texture unit circuit including a texture component generator circuit coupled to the system memory, the texture component generator circuit configured to:
compute, using the sampling parameters, an indirect source index for indirect addressing and sampling of the source tensor in the system memory.

9. The neural processor circuit of claim 1, wherein the tensor access operation circuit comprises a texture unit circuit including a texture filtering circuit coupled to the system memory, the texture filtering circuit configured to:
receive an indirect source index for indirect addressing of the source tensor in the system memory;
read the source tensor from the system memory using the indirect source index; and
process the source tensor to generate the output version of the source tensor.

10. The neural processor circuit of claim 1, wherein the tensor access operation circuit comprises a format converter and deinterleaver circuit coupled to the data processor circuit and a texture unit circuit of the tensor access operation circuit, the format converter and deinterleaver circuit configured to:
perform format conversion and deinterleaving of a processed version of the source tensor produced by the texture unit circuit to generate the output version of the source tensor for storage into the data processor circuit.

11. The neural processor circuit of claim 1, further comprising a planar engine circuit coupled to the at least one neural engine circuit and the data processor circuit, the planar engine circuit configured to:
perform a planar operation on at least a portion of the output data received from the data processor circuit to generate a version of the output data; and
write back the version of the output data into the data processor circuit.

12. A method of operating a neural processor circuit, comprising:
reading, by a tensor access operation circuit of the neural processor circuit, a source tensor from a system memory external to the neural processor circuit and coupled to the tensor access operation circuit by referencing an index tensor in the system memory representing indexing information into the source tensor;
storing an output version of the source tensor into a data processor circuit of the neural processor circuit coupled to the tensor access operation circuit;
sending the output version of the source tensor as a plurality of units of input data from the data processor circuit to at least one neural engine circuit of the neural processor circuit coupled to the data processor circuit; and
operating the at least one neural engine circuit by performing at least convolution operations on the plurality of units of input data received from the data processor circuit and at least one kernel to generate output data.

13. The method of claim 12, further comprising:
fetching, by a texture unit circuit of the tensor access operation circuit coupled to the system memory, one or more source components of the source tensor from the system memory by referencing the index tensor; and
processing, by the texture unit circuit, the one or more source components to generate the output version of the source tensor.

14. The method of claim 13, further comprising:
receiving a source index at a texture component generator circuit of the texture unit circuit coupled to the system memory;
reading, by the texture component generator circuit, the index tensor allocated in the system memory using the source index; and
computing, by the texture component generator circuit using the index tensor and the source index, an indirect source index for indirect addressing of the source tensor in the system memory.

15. The method of claim 14, further comprising:
fetching, by a texture filtering circuit of the texture unit circuit coupled to the system memory, the source tensor from the system memory using the indirect source index; and
processing, by the texture filtering circuit, the source tensor to generate the output version of the source tensor by applying multi-dimensional filtering to the source tensor.

16. The method of claim 15, further comprising processing, by the texture filtering circuit, the source tensor by performing bilinear resampling and boundary padding applied on the source tensor to generate the output version of the source tensor.

17. The method of claim 13, further comprising:
receiving, at a texture filtering circuit of the texture unit circuit coupled to the system memory, an indirect source index for indirect addressing of the source tensor in the system memory;
reading, by the texture filtering circuit, the source tensor from the system memory using the indirect source index; and
processing, by the texture filtering circuit, the source tensor to generate the output version of the source tensor.

18. The method of claim 12, further comprising:
performing, by a format converter and deinterleaver circuit of the tensor access operation circuit coupled to the data processor circuit and a texture unit circuit of the tensor access operation circuit, format conversion and deinterleaving of a processed version of the source tensor produced by the texture unit circuit to generate the output version of the source tensor for storage into the data processor circuit.

19. An electronic device, comprising:
a system memory; and
a neural processor circuit including at least one neural engine circuit, a data processor circuit and a tensor access operation circuit,
  the tensor access operation circuit coupled to the data processor circuit and the system memory, the tensor access operation circuit configured to read a source tensor from the system memory by referencing an index tensor in the system memory representing indexing information into the source tensor,
  the data processor circuit coupled to the tensor access operation circuit, the data processor circuit configured to:
    store an output version of the source tensor obtained from the tensor access operation circuit, and
    send the output version of the source tensor as a plurality of units of input data,
  the at least one neural engine circuit coupled to the data processor circuit, the at least one neural engine circuit configured to:
    receive the plurality of units of input data from the data processor circuit, and
    perform at least convolution operations on the plurality of units of input data and at least one kernel to generate output data.

20. The electronic device of claim 19, wherein the tensor access operation circuit comprises a texture unit circuit coupled to the system memory, the texture unit circuit configured to:
receive a source index;
read the index tensor allocated in the system memory using the source index;
compute, using the index tensor and the source index, an indirect source index for indirect addressing of the source tensor in the system memory;
fetch the source tensor from the system memory using the indirect source index; and
process the source tensor by applying multi-dimensional filtering to the source tensor to generate the output version of the source tensor.

* * * * *

UNITED STATES PATENT AND TRADEMARK OFFICE
CERTIFICATE OF CORRECTION

| | | |
|---|---|---|
| PATENT NO. | : 11,972,348 B2 | Page 1 of 1 |
| APPLICATION NO. | : 17/086023 | |
| DATED | : April 30, 2024 | |
| INVENTOR(S) | : Mills | |

It is certified that error appears in the above-identified patent and that said Letters Patent is hereby corrected as shown below:

In the Specification

In Column 3, Line 7, delete "(FIG. 1" and insert -- (FIG.) 1 --, therefor.

In Column 7, Line 11, delete "(tan h)," and insert -- (tanh), --, therefor.

Signed and Sealed this
Fourth Day of June, 2024

Katherine Kelly Vidal
*Director of the United States Patent and Trademark Office*